(12) United States Patent
Jihn

(10) Patent No.: US 10,839,444 B2
(45) Date of Patent: Nov. 17, 2020

(54) COACHING METHOD AND SYSTEM CONSIDERING RELATIONSHIP TYPE

(71) Applicant: UNIVERSITY-INDUSTRY COOPERATION GROUP OF KYUNG HEE UNIVERSITY, Yongin-si (KR)

(72) Inventor: Chang Ho Jihn, Seongnam-si (KR)

(73) Assignee: UNIVERSITY-INDUSTRY COOPERATION GROUP OF KYUNG HEE UNIVERSITY, Yongin-si (KR)

(*) Notice: Subject to any disclaimer, the term of this patent is extended or adjusted under 35 U.S.C. 154(b) by 205 days.

(21) Appl. No.: 15/317,676

(22) PCT Filed: Jun. 12, 2015

(86) PCT No.: PCT/KR2015/005909
§ 371 (c)(1),
(2) Date: Dec. 9, 2016

(87) PCT Pub. No.: WO2015/190856
PCT Pub. Date: Dec. 17, 2015

(65) Prior Publication Data
US 2017/0124627 A1    May 4, 2017

(30) Foreign Application Priority Data

Jun. 12, 2014  (KR) .................. 10-2014-0071730
Jun. 5, 2015   (KR) .................. 10-2015-0079875

(51) Int. Cl.
G06Q 30/00   (2012.01)
G06Q 30/06   (2012.01)
G06Q 50/00   (2012.01)

(52) U.S. Cl.
CPC ......... *G06Q 30/0631* (2013.01); *G06Q 50/01* (2013.01)

(58) Field of Classification Search
None
See application file for complete search history.

(56) References Cited

U.S. PATENT DOCUMENTS 7,356,490 B1 * 4/2008 Jacobi ............... G06Q 30/0601
                                                    705/26.8
8,538,830 B1 * 9/2013 Bae ................... G06Q 30/0201
                                                    705/26.1

(Continued)

FOREIGN PATENT DOCUMENTS

JP    2012-509519 A    4/2012
KR    10-2006-0047856 A    5/2006

(Continued)

OTHER PUBLICATIONS

Zheng Qin, "Introduction to E-commerce", 2009, Springer, springer.com (Year: 2009).*

(Continued)

*Primary Examiner* — Naeem U Haq
*Assistant Examiner* — Norman Donald Sutch, Jr.
(74) *Attorney, Agent, or Firm* — Sughrue Mion, PLLC

(57) ABSTRACT

A coaching method considering a relationship type includes the steps of: acquiring relationship data associated with building a relationship between a first object receiving coaching and a second object having a relationship with the first object; on the basis of the relationship data, inferring a relationship type between the first object and the second object; and determining a scheme of providing the coaching considering the inferred relationship type.

16 Claims, 5 Drawing Sheets

(56) References Cited

U.S. PATENT DOCUMENTS

| | | | |
|---|---|---|---|
| 8,972,314 B2* | 3/2015 | Pinckney | G06Q 30/02 |
| | | | 706/12 |
| 9,342,791 B2* | 5/2016 | Sinha | G06Q 30/02 |
| 2007/0174117 A1* | 7/2007 | Hendrickson | G06Q 30/02 |
| | | | 705/14.4 |
| 2010/0106573 A1* | 4/2010 | Gallagher | G06Q 30/00 |
| | | | 705/14.4 |
| 2010/0185625 A1* | 7/2010 | Johnson | G06Q 30/02 |
| | | | 707/748 |
| 2010/0223212 A1* | 9/2010 | Manolescu | G06Q 10/06 |
| | | | 706/12 |
| 2013/0159132 A1* | 6/2013 | Adams | G06Q 50/01 |
| | | | 705/26.7 |
| 2014/0040184 A1* | 2/2014 | Benissan | G06F 17/30699 |
| | | | 707/609 |
| 2014/0156645 A1* | 6/2014 | Brust | G06F 17/30554 |
| | | | 707/722 |
| 2014/0278786 A1* | 9/2014 | Liu-Qiu-Yan | G06Q 30/0201 |
| | | | 705/7.32 |
| 2015/0206113 A1* | 7/2015 | Stoll | G06Q 30/0631 |
| | | | 705/26.1 |

FOREIGN PATENT DOCUMENTS

| | | |
|---|---|---|
| KR | 10-2006-0073333 A | 6/2006 |
| KR | 10-2008-0092645 A | 10/2008 |
| KR | 10-0866080 B1 | 10/2008 |
| KR | 10-2009-0000402 A | 1/2009 |
| KR | 10-2009-0043839 A | 5/2009 |
| KR | 10-2009-0078561 A | 7/2009 |
| KR | 10-2009-0120176 A | 11/2009 |
| KR | 10-2012-0108536 A | 10/2012 |
| KR | 10-2013-0099240 A | 9/2013 |

OTHER PUBLICATIONS

Julian Sienkiewicz et al; "Entropy-growth-based model of emotionally charged online dialogues"; Jan. 26, 2012; physics.soc-ph (Year: 2012).*

International Search Report for OCT/KR2015/005909 dated Aug. 26, 2015 [PCT/ISA/210].

Korean Office Action dated Jun. 28, 2016 for Application No. 10-2015-0079875 dated Jun. 5, 2015.

* cited by examiner

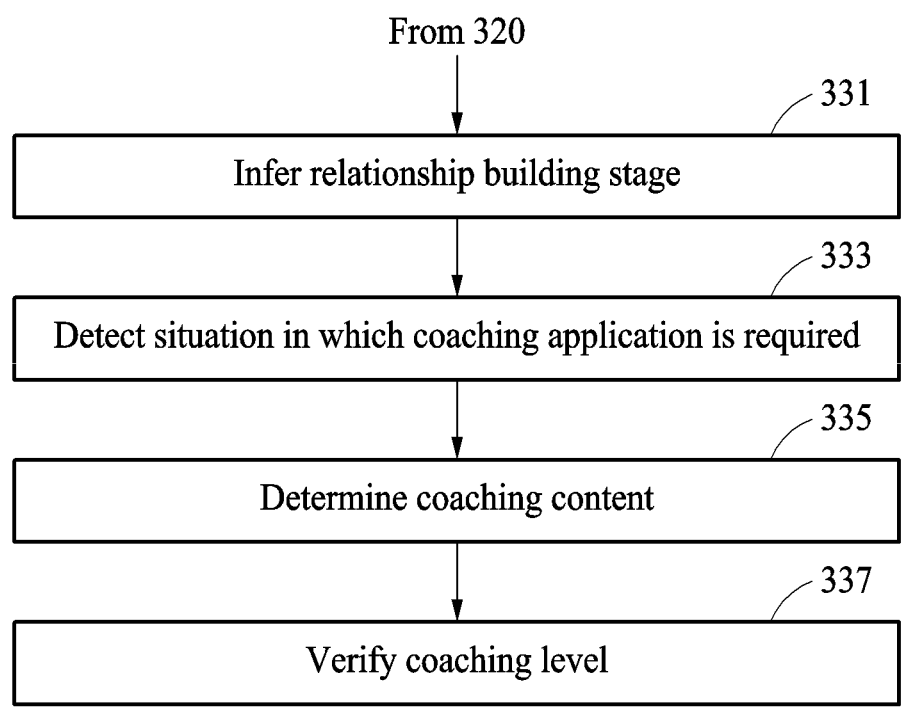

COACHING METHOD AND SYSTEM CONSIDERING RELATIONSHIP TYPE

CROSS REFERENCE TO RELATED APPLICATIONS

This application is a National Stage of International Application No. PCT/KR2015/005909, filed on Jun. 12, 2015, which claims priority from Korean Patent Application Nos. 10-2014-0071730, filed on Jun. 12, 2014, and 10-2015-0079875, filed on Jun. 5, 2015, the contents of all of which are incorporated herein by reference in their entirety.

TECHNICAL FIELD

At least one example embodiment relates to a coaching method and system based on a relationship type, for example, a coaching method and system by verifying a type of an interpersonal relationship.

RELATED ART

As a method of recommending a product candidate to be purchased by a user according to the related art, there are various recommendation methods, such as a content-based recommendation method, collaborative filtering recommendation method, etc. However, the methods recommend a product for the user.

For example, Korean Patent Publication No. 10-2012-0108536 discloses a technique of providing an anniversary notification service and providing product recommendation information including items of interest of a user and price information using a smartphone.

Korean Patent Publication No. 10-2009-0078561 includes an application server configured to store shopping information and product information, a smart content recommendation and transfer system configured to collect personal events associated with an acquaintance of a subscriber, to receive shopping information of the acquaintance from the application, to determine a preferred product of the acquaintance, to receive information about the preferred product from the application server, and to transfer the received information, and an Internet protocol (IP) multimedia subsystem configured to receive information about the event and the preferred product of the acquaintance from the smart content recommendation and transfer system and to provide the received information to an IP-based mobile communication network.

However, in Korean Patent Publication No. 10-2009-0078561, a simple product recommendation may be performed based on event information associated with the acquaintance of the subscriber. A relationship between the subscriber and the acquaintance may not be clearly inferred. A variety of relationship types may not be considered.

Korean Patent Publication No. 10-2006-0073333, Korean Patent Registration No. 10-866080, and Korean Patent Publication No. 10-2008-0092645 disclose a model configured to check a contact period with an acquaintance and the like, however, discloses only a model configured to perform only a simple notification based on information recorded in a terminal.

DETAILED DESCRIPTION

Technical Subjects

At least one example embodiment provides a system that may fuse a coaching service and a relationship network of a service user or an object.

Also, at least one example embodiment provides a method and system that may infer a relationship type between a service user or an object and a peripheral person thereof and may provide coaching based on the relationship type.

For example, at least one example embodiment provides a method and system that may coach a user on an action to be preferred by a person within the interpersonal relationship range of the user based on an inter-user relationship, instead of simply recommending a product for the user.

Also, at least one example embodiment provides a method and system that may coach a user on a gift, etc., to be preferred by a person within an interpersonal relationship range of the user, based on, for example, a relationship between users.

Also, at least one example embodiment provides a method and system that may verify an object to which an action is to be applied, a time of taking the action, and a recommendation acceptance level and range of an action executor, and may also verify a coaching information providing route and method preferred by the action executor, and may coach the user on an action type.

Solutions

According to an aspect of at least one example embodiment, there is provided a coaching method based on a relationship type, the method including acquiring relationship data associated with building a relationship between a first object receiving coaching and a second object having a relationship with the first object; inferring a relationship type between the first object and the second object based on the relationship data; and determining a coaching providing scheme based on the inferred relationship type.

According to an aspect of at least one example embodiment, there is provided a coaching system based on a relationship type, the coaching system including a relationship data acquirer configured to acquire relationship data associated with building a relationship between a first object receiving coaching and a second object having a relationship with the first object; a relationship type inferrer configured to infer a relationship type between the first object and the second object based on the relationship data; and a coaching providing scheme determiner configured to determine a coaching providing scheme based on the inferred relationship type.

Effects

According to example embodiments, there may be provided a system model that may fuse a coaching service and a relationship network of a service user or an object.

Also, according to example embodiments, there may be provided a method and system that may infer a relationship type between a service user or an object and a peripheral person thereof and may provide coaching based on the relationship type.

Also, according to example embodiments, there may be provided a method and system that may coach a user on an action to be preferred by a person within an interpersonal relationship range of the user based on an inter-user relationship, instead of simply recommending a product for the user.

Also, according to example embodiments, there may be provided a method and system that may coach a user on a gift, etc., to be preferred by a person within an interpersonal relationship range of the user, based on a relationship between users.

Also, according to example embodiments, there may be provided a method and system that may verify an object to which an action is to be applied, a time of taking the action, and a recommendation acceptance level and range of an action executor, and may also verify a coaching information providing route and method preferred by the action executor, and may coach the user on an action type.

For example, by enabling a terminal user to recognize a person to which a gift is to be presented among acquaintances of the terminal user and by recommending the terminal user for a time when the corresponding person desires to receive the gift and a type of the gift, it is possible to contribute to enhancing an interpersonal relationship of a service user.

BRIEF DESCRIPTION OF DRAWINGS

FIG. 5 is a flowchart illustrating a method of determining a coaching providing scheme according to an example embodiment.

BEST MODE

Figure 1:
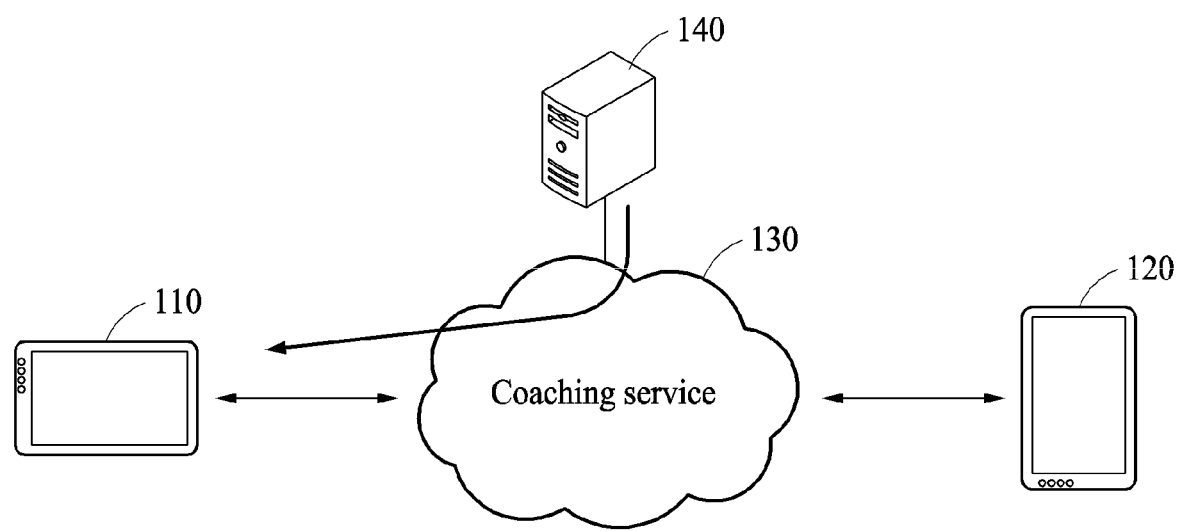
FIG. 1 is a diagram illustrating a configuration of a coaching system based on a relationship type according to an example embodiment.

Hereinafter, example embodiments will be described with reference to the accompanying drawings.

Initially, concepts of terms used herein will be described.

The term "relationship type" used herein may be applicable to any type of relationships that a decision or an action of a single object affects a decision or an action of another object in a situation in which two interacting objects are present, without being limited only to a relationship between one person and another person.

For example, the relationship type may be an interpersonal relationship type.

Also, the relationship type may be applied between devices in a computing environment or a thing Internet environment. Here, each device may correspond to an object.

For example, the example embodiments may be applicable in an environment in which data acquirement or data analysis for enhancing a relationship between devices is difficult because a coaching target device and a coaching application device are not in the same control area, that is, in a case in which it is difficult to verify needs, a circumstance, propensity of a counter device.

For example, it is possible to collect data transmitted from a first device to a second device, to infer a relationship type between the first device and the second device, and to provide coaching information to the first device based on the inferred relationship type.

For example, a server may infer a relationship type that the first device is a control entity and the second device is to be controlled, based on data, and may transmit, to the first device, "coaching information indicating that the first device is to inform the second device of shutting down after a predetermined period of time is elapsed". Here, the first device may or may not accept coaching based on a condition that is preset into consideration of a communication environment, a power status, ambient environment information, and the like.

Hereinafter, for convenience of description, the terms "relationship" and "object" are described generally based on an interpersonal relationship and a user, for example, a service subscriber.

Various types of coaching may be present. The interpersonal relationship may include gift coaching for enhancing an interpersonal relationship, or providing interpersonal relationship technique coaching information.

Also, coaching may include action coaching on an action of an object to be coached, transferring a specific command or circumstance to a device, and psychological coaching. For example, action coaching may be to recommend a gift to be presented and psychological coaching may be to affect the mentality of an object to be coached through the development of an interpersonal relationship or through advice or counseling.

Also, coaching information may include product recommendation, an action to be taken, and the like. Further, coaching information may include information about accuracy and reliability of coaching information to be provided.

While the related art simply manages the intimacy of an interpersonal relationship, the example embodiments provide coaching by inferring a relationship type and considering the relationship type.

If coaching information is to be provided to a robot or a device equipped with artificial intelligence, the coaching information may include a command to transfer a situation available for an action of the robot or the device or to inform the robot or the device of taking a specific action.

Hereinafter, for convenience of description, coaching is described based on gift coaching associated with a gift recommendation. However, the coaching may also include interpersonal relationship technique coaching.

FIG. 1 is a diagram illustrating a configuration of a coaching system based on a relationship type according to an example embodiment.

Referring to FIG. 1, the coaching system includes subscriber terminals 110 and 120 and a coaching service server 140 configured to provide a coaching service.

The subscriber terminals 110 and 120 may be connected to the coaching service server 140 over a communication network 130. Here, the communication network 130 may include a cloud computing environment, the wireless Internet, a near field communication network, and a mobile communication network, such as Long Term Evolution (LTE).

Figure 2:
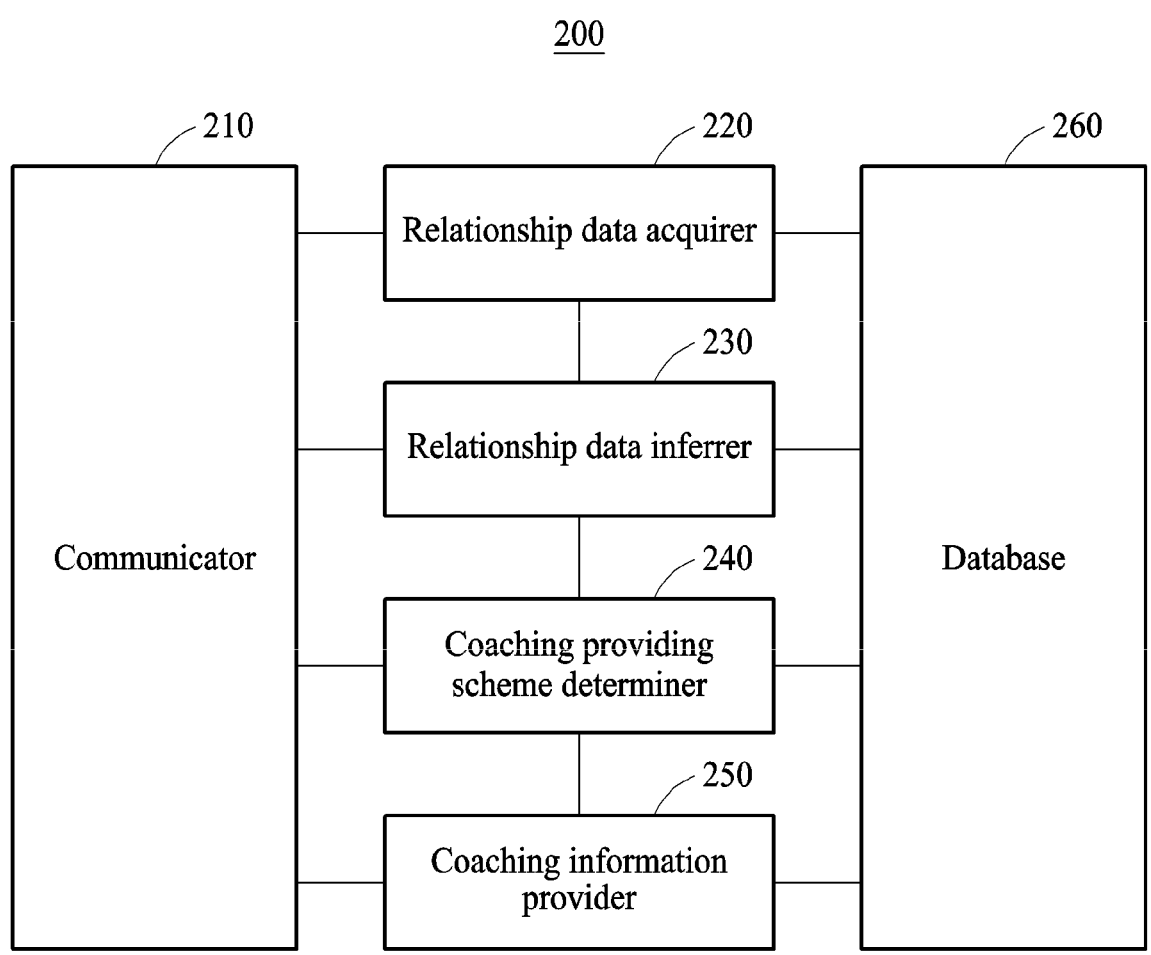
FIG. 2 is a block diagram illustrating a configuration of a coaching service server according to an example embodiment.

FIG. 2 is a block diagram illustrating a configuration of a coaching service server according to an example embodiment.

Referring to FIG. 2, a coaching service server 200 includes a relationship data acquirer 220, a relationship type inferrer 230, a coaching providing scheme determiner 240, and a coaching information provider 250. Also, the coaching service server 200 may further include a communicator 210 configured to collect data over a communication network and to transmit coaching information to a user terminal, etc., and a database 260 configured to store the collected data and created data.

The relationship data acquirer 220 acquires relationship data associated with building a relationship between a first object to be coached and a second object associated with the first object.

The relationship type inferrer 230 infers a relationship type between the first object and the second object based on the relationship data.

The coaching providing scheme determiner 240 determines a coaching providing scheme based on the inferred relationship type.

Here, the coaching providing scheme determiner 240 may perform at least one of a first procedure of inferring a relationship building stage between the first object and the second object, a second procedure of detecting a situation in which applying coaching for the second object is required, a third procedure of determining coaching content, and a fourth procedure of verifying a coaching level acceptable to the first object.

The coaching information provider 250 provides coaching information to the first object based on the coaching providing scheme.

Meanwhile, without awareness of the first object corresponding to a coaching target, the coaching service server 200 may determine that coaching for enhancing an interpersonal relationship between the coaching target and a specific person among persons included in interpersonal relationship range of the coaching target is required. In this case, the coaching service server 200 may proceed with coaching.

For example, if a preset relationship type between the first object and the second object is inferred as "cooperators" and a keyword associated with promotion of the second object is extracted from collected relationship data, the coaching service server 200 may coach the first object based on "promoted date and intimacy", etc. Here, coaching may be, for example, recommending a gift, and may be providing information, such as giving congratulations. Here, the keyword associated with the promotion of the second object may be extracted from text message information or congratulation comments on promotion posted to a social networking service (SNS) of the second object.

Accordingly, the coaching service server 200 may specify a coaching target based on the relationship data and may verify a coaching application target corresponding to the coaching target and a coaching application time.

Here, the coaching service server 200 may verify a coaching level, range, and method acceptable to the coaching target from the relationship data, and may also proceed with an appropriate coaching through a variety of types and schemes at an opportune time based on the verified coaching level, range, and method.

Meanwhile, the relationship data acquirer 220, the relationship type inferrer 230, the coaching providing scheme determiner 240, and the coaching information provider 250 of FIG. 2 may be provided to a user terminal as well as a server.

Hereinafter, example embodiments of a coaching method based on a relationship type that may be performed at the coaching service server 200 will be described with reference to FIGS. 3 through 5.

Figure 3:
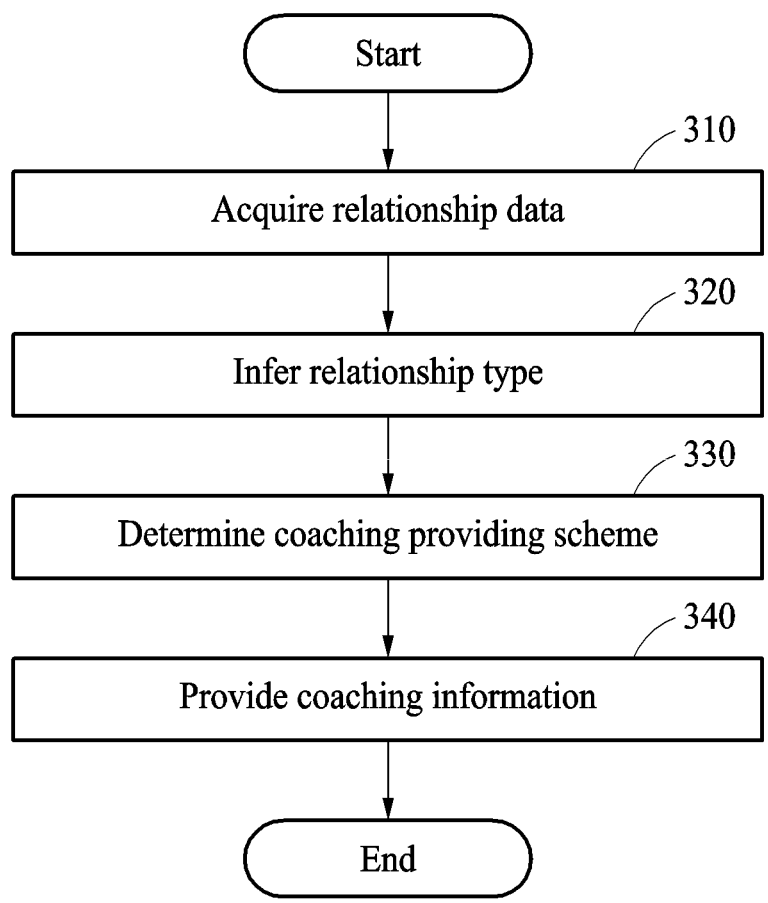
FIG. 3 is a flowchart illustrating a coaching method based on a relationship type according to an example embodiment.

FIG. 3 is a flowchart illustrating a coaching method based on a relationship type according to an example embodiment.

Referring to FIG. 3, in operation 310, the coaching service server 200 acquires relationship data associated with building a relationship between a first object receiving coaching, that is, to be coached and a second object having a relationship with the first object.

Here, the coaching may include providing coaching information associated with enhancing the relationship between the first object and the second object, and the second object may be a coaching application target to which the coaching is applied in response to executing the coaching.

In an example in which the coaching is recommending a gift, the first object may refer to a person that presents a gift and the second object may refer to a person that receives the gift. Accordingly, the coaching information may include information about providing a gift presentable from the first object to the second object or recommending an action type.

Building the relationship may relate to an interpersonal relationship between the first object and the second object, and the coaching may include coaching information used to enhance the interpersonal relationship between the first object and the second object.

Here, relationship data may be acquired and collected through a variety of channels. For example, the relationship data may be collected through a direct input of a user having joined a coaching service or an application installed on a smart device.

Also, relationship data may be data collected in an environment in which biometric data of users are measurable.

For example, relationship data may be data acquired through auditory sense, may be data acquired through vision, and may include tactile data collected through a sensor and the like, and biometric data, such as a motion of a pupil, a heart rate, a brainwave, and the like.

For example, heart rate information may be information measured through a device mounted to a smartphone or a peripheral device, for example, an earphone.

Heart rate data may be used to verify a preference based on a general phenomenon, such as an increase in a heart rate for a specific product, and may also be used to read a feeling for a specific person. If a heart rate increases during a conversation or confrontation with the specific person, an interpersonal relationship with the specific person may be inferred as an initial stage or a variation stage, not as a stabilization stage. The interpersonal relationship may be a friendly relationship or may be a hostile relationship.

Accordingly, if a heart rate increases in the friendly relationship, it may be inferred as a favorable situation. On the contrary, if a heart rate increases in the hostile relationship, it may be determined as a crisis situation. If a heart rate increases in a state in which a specific relationship is not built, it may be determined as an alert or cautious situation.

The relationship data may include at least one of SNS data associated with the first object and the second object, location information data associated with the first object and the second object, message data exchanged between the first object and the second object, and call related data between the first object and the second object.

As described above, the relationship data may widely include a variety of data used to analyze a behavior of a person.

The relationship data may be analyzed periodically or aperiodically every specific point in time, and may be analyzed per a plurality of points in times based on sequential change over time.

Hereinafter, various examples of channels used to collect relationship data will be described.

The relationship data may be collected and analyzed at a specific point in time, and may also be collected sequentially and repeatedly over a plurality of points in times.

For example, at least one of search log and cookie information associated with a use of a device may be collected through an application installed on a smart device.

Here, the search log may be collected at an operating system (OS) or the application installed on the terminal. For example, the search log may be an Internet surfing uniform resource locator (URL) and search keyword data.

A URL and a search keyword may be collected through cookie information recorded in a terminal or a computer, a smartphone application, or an OS, and may be transmitted to a server.

Communication data, such as call detail record (CDR), may be collected as relationship data. The communication data may include a call frequency, a call use period, a call time, etc., associated with a specific person or all of persons. Under personal agreements, content of recorded call conversations may be collected.

Also, the communication data may include a text message, an audio file, a video file or tag, communication counter party information, use protocol information, and the like.

The relationship data may also include demographic data. Here, the demographic data may include a variety of data, for example, an individual' gender, age, marital status, family members, current job or desired job, current income or desired income, etc.

The communication data may include text data, images, photos, etc, uploaded to an SNS account of a user, or exchanged between the user and other users. Data exchanged with the other users may be used to verify an interpersonal relationship type and stage.

The relationship data may include video data. In the case of image data acquired through a closed circuit television (CCTV) regarding escorting a counter party home at a relatively late time, the related persons may be inferred to have a relationship of lovers.

The relationship data may be collected from wearable devices, such as smart glasses, a smart watch, etc., which are currently commercialized. In this case, various types of data may be collected. For example, the relationship data may include gaze shift data of a user gazing a text and an image, and may also include a point of gaze, a gaze time, a gaze frequency, etc., when the user gazes at a photo. Data collected from the wearable devices may be acquired only in a special environment or from a limited user. Thus, a system may determine the reliability of collected data or whether to use the collected data based on a route, a device, etc., used to collect the data.

The gaze shift data of the user gazing at the text and the image may be collected through a device capable of acquiring gaze shift data of the user, such as EyeTracking, Google Glass, etc.

For example, a product preference may be verified based on a gaze stay time of the user from the gaze shift data, product information, or a product image.

Basically, the relationship data includes location information data.

The location information data may be latitude or longitude data of a global positioning system (GPS), and may be location information verified from a base station or a wireless access point. Also, in the case of a reader device installed in a specific place, location information or place information may be recorded in advance in a system.

Here, the location information data may be directly collected from a terminal, or may be collected from metadata of a photo uploaded to a cloud storage. Also, the location information data may be collected together with time information. A travel route, a stay time, a visit frequency, etc., may be collected.

The relationship data may include region information or place information corresponding to the location information. Here, the region information or the place information may be inferred at the server from the collected latitude and longitude information. Specific building or brand information, such as map data of a navigation device, may be directly collected.

In an example in which an amusement park categorized into a recreation area is present at a location of latitude A and longitude B and two persons not having a family relationship continuously visit the reaction area together, the two persons may be highly likely inferred to be lovers.

Collected data may include product or service purchase data used to infer an individual's interest, hobby, etc.

Purchase data may include a name of a purchased product, a purchase date/time, a purchase situation, a purchase frequency, purchase price, etc.

The purchased product, the purchase date/time, etc, may be used to infer an interpersonal relationship type by verifying a person with whom a purchaser is together, a person who has delivered the product, etc., and may also be used to verify a consumption level or a taste of the purchaser.

Also, a type of the purchased product may be used to verify an interpersonal relationship with a person that has accompanied the purchaser. For example, in the case of lovers, a progress stage of the lovers may be inferred through a payment at a coffee shop, a payment at a restaurant, a payment at a movie theater, a payment at an amusement park, a payment at overseas trips, etc.

If facial expression data of a person is collected, a facial expression of the person may be read to infer an interpersonal relationship stage with a counter party. Also, a facial expression of the person that views a product may be used to verify a preference of the person for the product.

If voice data is collected from a user terminal and the like, an emotional state of the person may be verified based on a voice call, an actual conversation, a frequency of a voice signal, an amplitude thereof, etc.

Here, information about the emotional state may be extracted using natural language process, a speech-to-text function, text mining, etc.

The voice data may be acquired through a sound input channel, such as a mobile phone, a PC, a CCTV, etc.

If skin conductivity data used for a lie detector is collected, a feeling of the person may be read from the data.

All of the collected data may be used to infer a relationship based on a configuration environment. Only a portion of the data may be used to infer the relationship. Also, the collected data may be analyzed with respect to all of relationship types. Only a relationship type inferable from the collected data may be inferred among the entire relationship types.

In operation 320, the coaching service server 200 infers the relationship type based on the collected relationship data.

In operation 330, the coaching service server 200 determines a coaching providing scheme based on the inferred relationship type.

In operation 340, the coaching service server 200 may provide coaching information to the first object based on the determined coaching providing scheme.

For example, coaching information may be provided at a time desired by the coaching target, or at a time at which coaching is determined to be required without awareness of the coaching target.

Here, the coaching information may be provided using a text, an image, a video, and voice, and, if a preset condition is satisfied, may also be provided using any type of routes and methods, such as a brainwave, capable of transferring an intent or a meaning to a person. There is an example in which a body of another person was controlled through brainwave exchange.

Here, the coaching service server 200 may classify a behavior of an object into an "action" and an "action occurrence situation", and may analyze the behavior of the object.

Examples of Action Type

Visual action: gaze, gaze shift

Auditory action: conversation, call transmission/reception

Virtual space action: transmission and reception of message/image/video, SNS activities, online purchase, movement of online site Real space action: movement of place, offline purchase Examples of Action Occurrence Situation Time situation category: personal time zone, social time zone, personally/socially coexisting time zone, unconscious time zone, etc.

Real space situation category: recreation area, adult entertainment district, workplace, theater, etc.

Virtual space situation category: a plurality of categories of online site, such as shopping mall, movie, newspaper, search portal, etc.

An interpersonal relationship type and stage may be inferred by analyzing data acquired through various combinations of (action type×action occurrence situation). The same data may be variously interpreted for each combination.

An interpersonal relationship type may be classified into a family, a teacher, a friend, a lover, a community member, etc, based on a role. Also, the interpersonal relationship type may be classified into a business relationship, a seller-and-purchaser relationship, a cooperation relationship, etc., based on a purpose.

Figure 4:
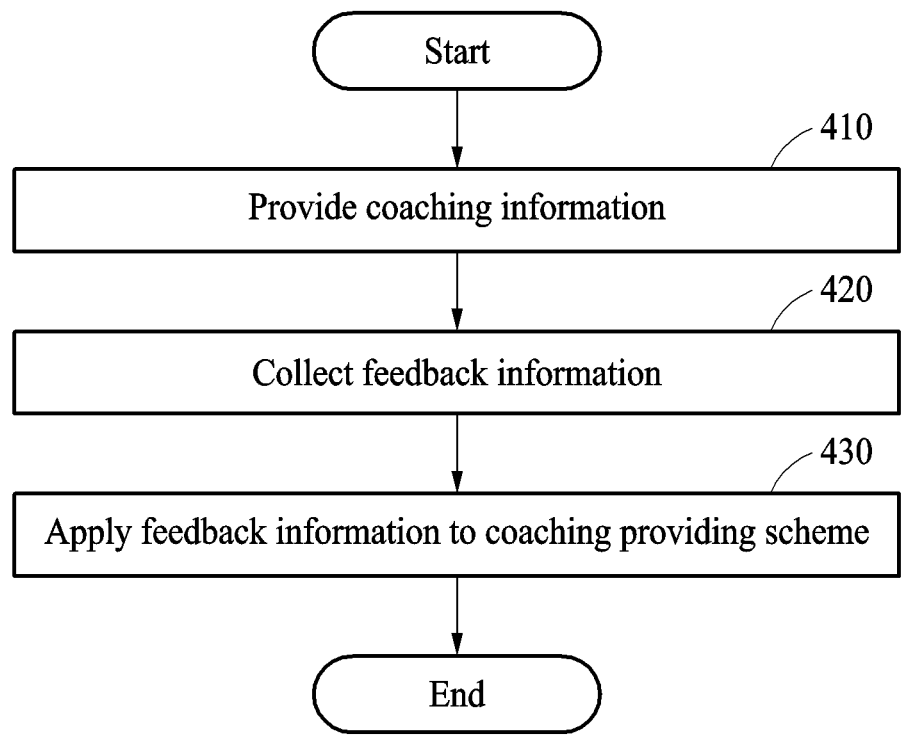
FIG. 4 is a flowchart illustrating a coaching method based on a relationship type according to another example embodiment.

FIG. 4 is a flowchart illustrating a coaching method based on a relationship type according to another example embodiment.

The example embodiment of FIG. 4 may be performed after performing operation 340 of FIG. 3. Accordingly, operation 410 of FIG. 4 may be same as operation 340 of FIG. 3.

In operation 420, the coaching service server 200 collects feedback information about a result of providing the coaching or feedback information about a result of applying the coaching.

In operation 430, the coaching service server 200 may apply the collected feedback information to the coaching providing scheme.

Accordingly, coaching may be iteratively performed, instead of being performed once. A reaction of the coaching target to providing of the coaching and a result of applying the provided coaching to the coaching application target may be used to provide further appropriate coaching in the future.

For example, data used to determine a reaction of the coaching target may be collected through a variety of channels, without being limited to a terminal of the coaching target. Similarly, data used to determine a reaction of the coaching application target may be collected through a variety of channels, without being limited to a terminal of the coaching application target.

FIG. 5 is a flowchart illustrating a method of determining a coaching providing scheme according to an example embodiment.

Referring to FIG. 5, in operation 330 of determining the coaching providing scheme of FIG. 3 may include at least one of a first procedure 331 of inferring a relationship building stage between the first object and the second object, a second procedure 333 of detecting a situation in which applying coaching for the second object is required, a third procedure 335 of determining coaching content, and a fourth procedure 337 of verifying a coaching level acceptable to the first object.

Accordingly, operation 330 may include a process of verifying an event time of the second object from the relationship data and a process of determining a time of providing coaching associated with the second object to the first object based on the event time.

Here, the third procedure 335 may include a process of acquiring preference and interest information of the second object and a process of determining content of the coaching based on the consumption level and the preference and interest information.

Here, the fourth procedure 337 may include a process of verifying a consumption level of the first object.

Here, the relationship type and the relationship building stage may be inferred based on information about an action occurrence situation and an action type of the first object or the second object.

For example, an interpersonal relationship stage indicates a progress stage of a corresponding relationship. In a business relationship, a progress stage thereof may be classified based on an increase in the reliability, etc. In a friend relationship, a progress stage thereof may be classified based on intimacy, etc.

Feelings may be classified into, for example, like, respect, love, loathe, dislike, jealous, etc.

A tendency of the interpersonal relationship building stage may be classified into becoming close, becoming estranged, becoming deeper, becoming shallower, etc.

For example, a criterion of determining a coaching level and range may be set based on a preference method of a coaching target, an interpersonal relationship type between the coaching target and a coaching application target, an interpersonal relationship stage between the coaching target and the coaching application target, a psychological or physical situation of the coaching target.

For example, a product presentable to a colleague and a product presentable to a lover may be different. Also, even between lovers, a product presentable at an initial stage and a product presentable at an intermediate stage may be different. Based thereon, a coaching level and range may be determined.

Hereinafter, an example in which building of a relationship relates to an interpersonal relationship and coaching relates to presenting a gift will be described.

A scheme of recommending a gift as coaching may include a hybrid recommendation scheme in which a content-based recommendation scheme and a collaborative filtering recommendation scheme are fused.

Here, the content-based recommendation scheme recommends a product based on content of the product and a user preference, and the collaborative filtering recommendation scheme recommends a product preferred or interested in by other users similar to the user.

The coaching service server 200 may recommend a gift by mixing the content-based recommendation scheme and the collaborative filtering recommendation scheme.

To recommend a target to receive a gift, the coaching service server 200 may verify an interpersonal relationship type and stage of the user.

Also, to recommend a time for presenting a gift, the coaching service server 200 may verify event times, for example, birthdays, anniversaries, births, etc., of persons included in an interpersonal relationship network.

Also, to recommend a gift, the coaching service server 200 may verify product preferences and interests of persons included in the interpersonal relationship network.

Also, the coaching service server 200 may verify a consumption level of a person who is to present a gift.

The coaching service server 200 may verify a present time, a preference of a gift recipient, and a consumption level of a gift presenter, and may recommend a user for a product that is within interest range of the gift recipient and also suitable for the gift presenter at an appropriate time, based on an interpersonal relationship type and relationship building stage between the gift recipient and the gift presenter.

Here, although all of the present time, the preference of the gift recipient, the consumption level of the gift presenter are not satisfied, the coaching service server 200 may put top priority to the consumption level of the gift presenter or may apply a weight to a single element, and may recommend a gift based on an element corresponding to the top priority.

An interpersonal relationship type of a user, that is, a service subscriber may be inferred based on demographic information, such as the user's address, age, job, gender, etc., location information collectable by use of a terminal, mutual contact information by the terminal, and text and photo information created at an SNS.

For example, the interpersonal relationship type may include a family relationship, a friend relationship, an opposite sex relationship, and a colleague relationship.

Meanwhile, in response to an input or a collection of information used to accurately verify a relationship, the coaching service server 200 may determine the interpersonal relationship type without going through a separate inference process.

For example, if a family discount or a couple discount of a communications company, a family relationship certificate, a school yearbook, an address book, etc., of the user are secured, a relationship between two persons may be accurately verified.

Also, if a father, a mother, etc., indicating the family relationship is included in contact information of information collected from the user, the interpersonal relationship type may be accurately verified.

As an example of demographic information, communications company subscriber information may be used.

<Example of Inferring an Interpersonal Relationship Type of a Family Relationship or a Relationship Estimated as a Family>

To infer a family relationship and the like by analyzing a behavior of a user, use log data, use history information, etc., of a user terminal may be used.

Here, the coaching service server 200 may infer the interpersonal relationship type by classifying a relationship into a large category and then further categorizing the relationship in detail. For example, if users have the same address information, the users may be inferred to have "same address relationship" or "family relationship", and a detailed relationship type may be inferred as, such as a father, a mother, a younger sister, a younger brother, etc., based on age information and gender information.

The family relationship may be inferred based on the same address, an appropriate age difference, a gender configuration, a go-to-bed place and a bedtime, an address clock-in and clock-out time, a daytime activity area of a member, etc. The address, the age difference, and the gender configuration may be verified from demographic information. The go-to-bed place and the bed time, the address clock-in and clock-out time, and the daytime activity area of the member may be verified from location information.

Currently, a smartphone user has a strong tendency to use a smartphone from a moment at which the user wakes up until the user falls asleep. Accordingly, a bedtime and place, and a wakeup time and place may be collected through an OS or an application of collecting a use time history of a smartphone. The collected information may be used to infer the relationship type.

For example, if five persons live at the same residential area, ages of the five persons are 70 years old, 45 years old, 43 years old, 15 years old, and 13 years old, the coaching service server 200 may infer a relationship type of these five persons as a family relationship.

Also, if persons living at the same residential area go to bed or wake up around a similar time, the persons may also be inferred to have a family relationship. Here, a first used time and a last used time of a terminal during a day are to be collected.

As another example, if persons are regularly connected through phones, SNS messengers, etc., on a specific day, for example, a birthday, a wedding anniversary, Parents Day, and a holiday, and gather together at the same location, the persons are highly likely to be family members. That is, if persons attempt a contact or search for a gift simultaneously at a specific point in time based on CDR data, another supporting ground may be acquired. For example, if some of persons inferred to be family members gather together at the same place or further frequently contact with each another before Parents Day and maintain an ordinary contact frequency with remaining family member, a probability that the persons having the increased contact frequency are children and the persons maintaining the ordinary contact frequency are parents.

Meanwhile, a daily life of a person is generally divided into two areas, a sleeping area and an activity area excluding the sleeping area. Here, the activity area may be a workplace and may also be a school. The coaching service server 200 may define the activity area by analyzing a pattern of an area that the person regularly visits and stays at a certain period of time, a pattern of an area that the person comes in and out, etc. If a school is a main activity area and an age corresponds to a student age, the person may be a student. If the age corresponds to a staff age, the person may be a staff. Further, it is highly likely that the student is a child and the staff is a parent or a grownup child. The staff may be classified into the parent or the grownup child based on the age.

Also, a family relationship may be verified from images or texts uploaded to or exchanged at an SNS. Also, the family relationship may be verified based on a ratio included in the same image and whether a word used to analyze the family relationship is included in the description of the image. If a plurality of persons regularly appears at the same time in a plurality of photos, the plurality of persons may be highly likely to have the family relationship as a result of analyzing other data.

<Example of Inferring an Interpersonal Relationship Building Stage of a User>

The interpersonal relationship stage may be inferred based on mutual contact frequency information, expression information, and location information.

The interpersonal relationship stage may be arbitrarily classified into a plurality of stages. An upper stage indicates that the corresponding relationship is strongly built.

Here, a relatively high contact frequency may be inferred as an upper stage.

A relatively longer stay time at the same location together may be inferred as an upper stage.

The coaching service server 200 may calculate the interpersonal relationship as scores and may determine a coaching level based on the calculated scores. For example, if coaching relates to recommending a gift and the interpersonal relationship is inferred as an upper stage, the coaching service server 200 may recommend a high-priced product.

A stage may be classified based on a contact point in time that may be represented as a contact day and a contact time. If a contact frequency during a private time or a companion time increases, a corresponding stage may be classified to rank an upper stage.

If a companion frequency in images increases, a corresponding stage may indicate an upper stage.

If a captured place or background of an image is a private space, a corresponding stage may be classified as an upper stage.

If a ratio of formal expressions to expressions used for contact decreases, a corresponding stage may indicate an upper stage.

The coaching service server 200 may assign preset scores to a classification criterion, and may infer a relationship building stage as maintain, improve, strengthen, or decline based on the scores.

A coaching level and range may be differently applied based on the inferred relationship building stage, for example, maintain, improve, strengthen, or decline.

<Verify an Event Time of a Gift Recipient>

An event time of a gift recipient corresponding to a coaching application target in response to an execution of coaching by a coaching target may use disclosed information or collected personal event information. For example, the event time of the gift recipient may use information basically recorded in personal information, such as a birthday, a wedding anniversary, etc., provided to a company, and information disclosed at an SNS.

If the event time of the gift recipient is not clearly inferred, the coaching service server 200 may also infer the event time or a coaching execution time based on related information.

For example, the coaching service server 200 may infer an event by verifying a search pattern of a person. For example, if a search keyword of the gift recipient is associated with childbirth, the coaching service server 200 may infer a time of childbirth by verifying a change in the search keyword. If a searching frequency using a related search keyword increases and the search keyword is related to a specific product, the coaching service server 200 may infer that the time of childbirth has come close.

Also, the coaching service server 200 may infer an event from a purchase pattern. The coaching service server 200 may infer a time of childbirth based on a purchase product. A product purchased at an early stage of pregnancy is different form a product purchased at a final stage of pregnancy. Such information may be acquired from payment information and may also be acquired by verifying location information of the person and products being sold at the corresponding location.

If a call use record of the gift recipient is collected, an event time may be inferred based on a contact frequency. For example, if a frequent contact number of the gift recipient is verified as obstetrics, the coaching service server 200 may infer the event time as one month later, a few weeks later, etc.

Also, if a hospital visit frequency and a visit period are verified based on location information of the gift recipient and information about a payment amount, a type of test and the like are collected, the coaching service server 200 may verify a time of childbirth and may determine a coaching time.

<Recommend a Product Desired by a Gift Recipient>

Gift related coaching may be provided based on a product desired by a gift recipient.

The coaching service server 200 may coach a user using an existing product recommendation scheme for the user himself or herself.

For example, the coaching service server 200 may infer a product that is estimated to be desired by the gift recipient, and may recommend the inferred product in response to a search of a coaching target for a product for the gift recipient.

The coaching service server 200 may perform coaching by verifying an interest of the gift recipient that is a user of a gift. For example, the coaching service server 200 may verify products previously preferred by the user from a current interest and purchase of the user, through use information data, such as a URL, and a search log, and may subdivide the products in further detail based on age and gender, and may recommend a product.

For example, if the gift recipient continuously visits a homepage of "PRADA" and many of previously preferred products are bags, the coaching service server 200 may estimate that the gift recipient desires to receive a "PRADA bag" as a gift.

In the case of an expensive product, the coaching service server 200 may provide related information to the coaching target, and may verify sale period information of the expensive product, and may coach the coaching target on "please inform a coaching application target of information about a special sale period of the expensive product" as coaching information.

The coaching service server 200 may also provide coaching information through grouping of users. The coaching service server 200 may use personal information data, previous purchase history, etc., of the user to classify and group users into similar users. The coaching service server 200 may verify a group that includes the gift recipient, and may recommend the coaching target for a product with which the gift recipient may be satisfied based on consumption nature of the group.

For example, if the gift recipient steadily searches for camping gear, and visits related sites, and a gender of the gift recipient is a male and is verified to have a spouse and a child, the gift recipient may be included in a "family camping" group. Further, if the gift recipient searches for a "hammer", the coaching service server 200 may recommend the coaching target for a camping hammer preferred in the group.

<Example of Inferring a Recommendation Acceptance Level and Range of a Gift Presenter>

For example, the recommendation acceptance level of the gift presenter may be a consumption level, and the recommendation acceptance range may relate to whether a product is presentable personally or officially only.

The coaching service server 200 may verify the recommendation acceptance level and range based on purchase history of the gift presenter and a relationship type between the gift presenter and the gift recipient.

The coaching service server 200 may subdivide the purchase history for each relationship type, or may subdivide the recommendation acceptance level and range for each relationship building stage.

Also, the coaching service server 200 may infer a level and range acceptable to a current point in time by verifying a tendency of the recommendation acceptance level and range.

The apparatuses described herein may be implemented using hardware components, software components, and/or combination of the hardware components and the software components. For example, the apparatuses and the components may be configured using at least one universal computer or special purpose computer, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct and/or configure the processing device to operate as desired, thereby transforming the processing device into a special purpose processor. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, and DVDs; magneto-optical media such as optical discs and floptical disks; and hardware devices that are specially configured to store and perform program instructions, such as read-only memory (ROM), random access memory (RAM), flash memory), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific example embodiments, it will be apparent to one of ordinary skill in the art that various alterations and modifications in form and details may be made in these example embodiments without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A coaching method based on an interpersonal relationship type associated with a coaching system, the coaching system including a memory configured to store computer-readable instructions and one or more processors configured to execute the computer-readable instructions, the method comprising:

acquiring, by the one or more processors, interpersonal relationship data associated with building an interpersonal relationship between a first user receiving coaching and a second user having the interpersonal relationship with the first user, wherein the interpersonal relationship data includes biometric data of the first user or the second user and at least one of social networking service (SNS) data associated with the first user and the second user, location information data associated with the first user and the second user, message data exchanged between a first terminal device of the first user and a second terminal device of the second user, and call related data between the first user and the second user, and wherein the acquiring the interpersonal relationship data includes acquiring the biometric data through a biometric sensor of the first terminal device or the second terminal device;

determining, by the one or more processors, an interpersonal relationship type between the first user and the second user among a plurality of interpersonal relationship types based on the interpersonal relationship data including the biometric data, wherein the determining the interpersonal relationship type includes inferring, by the one or more processors, the interpersonal relationship type between the first user and the second user based on the interpersonal relationship data including the biometric data for action occurrence situation or the interpersonal relationship data including the biometric data for an action type of the first user and the second user; and determining, by the one or more processors, a coaching providing scheme based on the determined relationship type and an interpersonal relationship building stage by performing a first procedure of inferring the interpersonal relationship building stage between the first user and the second user using the interpersonal relationship data, a second procedure of detecting a situation in which applying coaching for the second user is required, a third procedure of determining coaching content, and a fourth procedure of verifying a coaching level acceptable to the first user.

2. The method of claim 1, wherein the coaching includes providing coaching information associated with enhancing the interpersonal relationship between the first user and the second user, and the second user is a coaching application target to which the coaching is applied in response to executing the coaching.

3. The method of claim 2, wherein the coaching information includes information about providing a gift presentable from the first user to the second user or recommending an action type.

4. The method of claim 1, wherein the coaching includes providing coaching information used to enhance the interpersonal relationship between the first user and the second user.

5. The method of claim 1, further comprising:
providing, by the one or more processors, coaching information to the first user based on the coaching providing scheme.

6. The method of claim 1, further comprising:
collecting, by the one or more processors, feedback information about a result of providing coaching information or feedback information about a result of applying the coaching; and
applying, by the one or more processors, the collected feedback information to the coaching providing scheme.

7. The method of claim 1, wherein the determining of the coaching providing scheme comprises a process of verifying an event time of the second user from the interpersonal relationship data and a process of providing coaching associated with the second user to the first user based on the event time.

8. The method of claim 1, wherein the interpersonal relationship data further includes purchase data of the first user and purchase data of the second user, and
wherein the determining of the coaching content comprises:
(i) determining a consumption level of the first user based on the purchase data of the first user,
(ii) acquiring preference information of the second user based on a search log obtained through the second terminal device of the second user and the purchase data of the second user, and
(iii) determining the coaching content based on the consumption level of the first user and the preference information of the second user, and
wherein the determining of the coaching content comprises: determining the coaching content by assigning a preset weight to one of the consumption level of the first user and the preference information of the second user.

9. The method of claim 1, wherein the biometric data includes at least one of a motion of a pupil, a heart rate and a brainwave.

10. The method of claim 1, wherein the interpersonal relationship data includes at least one of gaze shift data, a point of gaze, a gaze time and a gaze frequency of a user obtained through a wearable device of the user.

11. A coaching system based on an interpersonal relationship type, the coaching system comprising:
a memory configured to store computer-readable instructions; and
one or more processors configured to execute the computer-readable instructions such that the one or more processors are configured:
to acquire interpersonal relationship data associated with building an interpersonal relationship between a first user receiving coaching and a second user having the interpersonal relationship with the first user, wherein the interpersonal relationship data includes biometric data of the first user or the second user and at least one of social networking service (SNS) data associated with the first user and the second user, location information data associated with the first user and the second user, message data exchanged between a first terminal device of the first user and a second terminal device of the second user, and call related data between the first user and the second user, the one or more processors being configured to acquire the biometric data through a biometric sensor of the first terminal device or the second terminal device,
to determine an interpersonal relationship type between the first user and the second user among a plurality of relationship types based on the interpersonal relationship data, the determination of the interpersonal relationship type includes inferring the interpersonal relationship type between the first user and the second user based on the interpersonal relationship data including the biometric data for action occurrence situation or the interpersonal relationship data including the biometric data for an action type of the first user and the second user, and
to determine a coaching providing scheme based on the determined relationship type and an interpersonal relationship building stage by performing a first procedure of inferring the interpersonal relationship building stage between the first user and the second user using the interpersonal relationship data, a second procedure of detecting a situation in which applying coaching for the second user is required, a third procedure of determining coaching content, and a fourth procedure of verifying a coaching level acceptable to the first user.

12. The coaching system of claim 11, wherein the one or more processors provide coaching information to the first user based on the coaching providing scheme.

13. The coaching system of claim 11, wherein the action occurrence situation includes at least one of time situation, real space situation and virtual space situation, and
wherein the action type includes at least one of a visual action, auditory action, virtual space action, and real space action.

14. The coaching system of claim 11, wherein the interpersonal relationship data further includes purchase data of the first user and purchase data of the second user, and
wherein the determining of the coaching content comprises:
(i) determining a consumption level of the first user based on the purchase data of the first user,
(ii) acquiring preference information of the second user based on a search log obtained through the second terminal device of the second user and the purchase data of the second user, and
(iii) determining the coaching content based on the consumption level of the first user and the preference information of the second user, and
wherein the determining of the coaching content comprises:
determining the coaching content by assigning a preset weight to one of the consumption level of the first user and the preference information of the second user.

15. The coaching system of claim 11, wherein the biometric data includes at least one of a motion of a pupil, a heart rate and a brainwave.

16. The coaching system of claim 11, wherein the interpersonal relationship data includes at least one of gaze shift data, a point of gaze, a gaze time and a gaze frequency of a user obtained through a wearable device of the user.

\* \* \* \* \*